No. 610,628. Patented Sept. 13, 1898.
A. G. JACOBS.
PUZZLE MAP GAME.
(Application filed May 28, 1898.)
(No Model.)
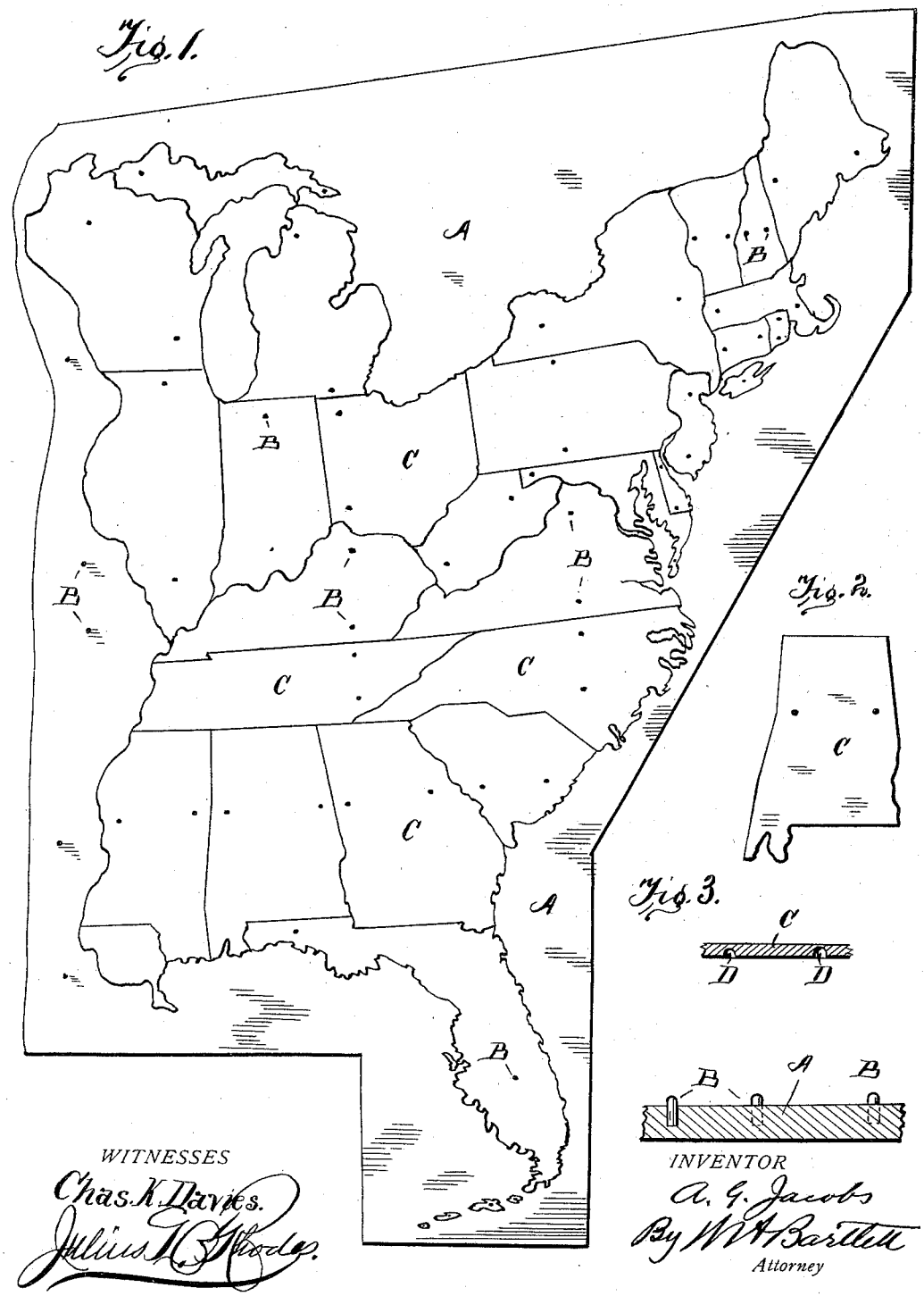

UNITED STATES PATENT OFFICE.

AUGUSTUS G. JACOBS, OF JONESTOWN, MISSISSIPPI.

PUZZLE-MAP GAME.

SPECIFICATION forming part of Letters Patent No. 610,628, dated September 13, 1898.

Application filed May 28, 1898. Serial No. 682,031. (No model.)

*To all whom it may concern:*

Be it known that I, AUGUSTUS G. JACOBS, residing at Jonestown, in the county of Coahoma and State of Mississippi, have invented certain new and useful Improvements in Puzzle-Map Games, of which the following is a specification, reference being had therein to the accompanying drawings.

This invention relates to puzzle maps or games.

The object of the invention is to produce a sectional map which shall be a convenient and useful educational appliance and which can also be used as a part of a game apparatus, whereby instruction and amusement may be combined.

Figure 1 is a plan of a map representing a part of the United States, the States being formed by separate pieces and attached to a base. Fig. 2 is a plan of one of the sections or subdivisions. Fig. 3 is a section of one of the subdivisions. Fig. 4 is a broken section of the board or support on which the map or game is assembled.

A indicates a portion of the surface of a game-board, which board is provided, preferably, with projecting pins B. The pins B, two for each subdivision of the map to be mounted on the board, are arranged with reference to the map-sections to be mounted on the board. Thus when each of the map-sections is in the form of or has the outline of one of the States of the United States each one of these States or sections C will be provided with two holes D D, corresponding in position with the two pins on the game-board, but generally only with one set of two pins. The pins can be arranged in groups, so that no two map-sections or States can be applied to the same pins, or if it be desired to make the game more difficult a like arrangement of pins and pin-holes may be made for several States or sections.

The map may represent any country or portion of the earth or other surface. The subdivisions thereon may be known as "natural" or as "political." Thus a map of the islands of the Carribean Sea might have for its attached sections blocks in the form of the islands referred to. A State map might have its surface divided according to the counties, and so on.

Each section C, representing a State, county, town, or other subdivision, will be represented by a block C, having the outline of such State, county, or subdivision. The section C will have two holes or recesses D, corresponding in size and position with the two pins B on the board, to which section C of the map should be attached. Then when the section C is applied it will be held to the board of base A in the right position for the application of the other sections.

The pins B on the board and the holes or recesses D in the sections of the map may have a definite relation to a given unit of measurement and to location on the board. Thus the two holes in a given section may be one-half inch apart and in a given direction on the board. Another section may have the holes three-fourths of an inch apart. Other sections may have the holes a like distance apart, but in different directions on the board.

To play the game, the sections are all removed from the board and mixed up. The board preferably should have no indication on its surface as to where the sections belong except the pins and perhaps an outline of the map. The sections show by their outline the form of the subdivision and may be on one face accurate maps. The other face should have no indications except the pin holes or recesses corresponding to the pins in the board, and this face with the recesses therein is turned upward. Then the player is permitted to draw one of the sections, and if he applies it at the first trial to the proper pins he scores one on the game. If he fails to apply the section or subdivision in its proper place he does not score, but retains the piece and may in proper turn make another trial, or his opponent may draw the piece, and if he applies it properly the first trial may not only score, but "set back" the unsuccessful competitor. Thus by alternate drawings a very interesting game may be played and information relating to geography quickly acquired. The eye is also educated as to distances.

The game may be varied in many ways and is both interesting and instructive.

I am aware that sectional maps, pictures, &c., are not broadly new. I claim for my device that the base-board and pins make a map on which the adjustment of parts may be perfect and which may teach not only geography, but also an accurate estimate of short distances by the eye.

What I claim is—

1. The puzzle-map game substantially as described, consisting of a board with pins therein arranged in pairs and at varying distances between the pins of a pair, and the sectional map, the sections having the outlines of various subdivisions, and each having a plurality of recesses or holes corresponding in distance apart to the pins in the board, whereby the sections may be assembled and held on the board, substantially as described.

2. The puzzle-map game described, consisting of a base-board with pins projecting therefrom, the pins being arranged as different pairs corresponding to each sectional subdivision, and the subdivisional sectional map having each a pair of holes corresponding to the pair of pins on the base-board and differing from other sections, the outline of said map being indicated on the base-board and the details being shown on not more than one side of the map-sections, substantially as described.

In testimony whereof I affix my signature in presence of two witnesses.

AUGUSTUS G. JACOBS.

Witnesses:
W. R. RICHARDSON,
J. R. COLTURS.